United States Patent [19]

Maier

[11] 3,742,752
[45] July 3, 1973

[54] PLUNGER FOR EXTRUSION PRESS

[75] Inventor: Bruno Maier, Worblingen, Germany

[73] Assignee: Swiss Aluminium, Ltd., Neuhausen am Rhinefall, Switzerland

[22] Filed: Aug. 10, 1971

[21] Appl. No.: 170,546

[30] Foreign Application Priority Data
Aug. 14, 1970  Switzerland.................. 12233/70

[52] U.S. Cl..................................... 72/273, 72/478
[51] Int. Cl............................................. B21c 25/00
[58] Field of Search............................. 72/273, 478

[56] References Cited
UNITED STATES PATENTS
3,385,091  5/1968  Hess................................. 72/273
FOREIGN PATENTS OR APPLICATIONS
1,043,355  9/1966  Great Britain..................... 72/273
1,032,206  6/1958  Germany........................... 72/273

Primary Examiner—Charles W. Lanham
Assistant Examiner—Robert M. Rogers
Attorney—Ernest F. Marmorek

[57] ABSTRACT

Disclosed is an elongated plunger body having an axial through-bore; a pressure head arranged for radial movement on the front face of the plunger body; a stem secured to the pressure head and passing with a clearance through the through-bore; the stem being formed at a central region thereof with a collar tightly fitting in the through-bore, and at the other end thereof being secured to the plunger body and locked against axial movement, whereby the flexibility of the stem portion between the pressure head and the collar allows elastic centering of the pressure head during the stroke of the plunger.

5 Claims, 2 Drawing Figures

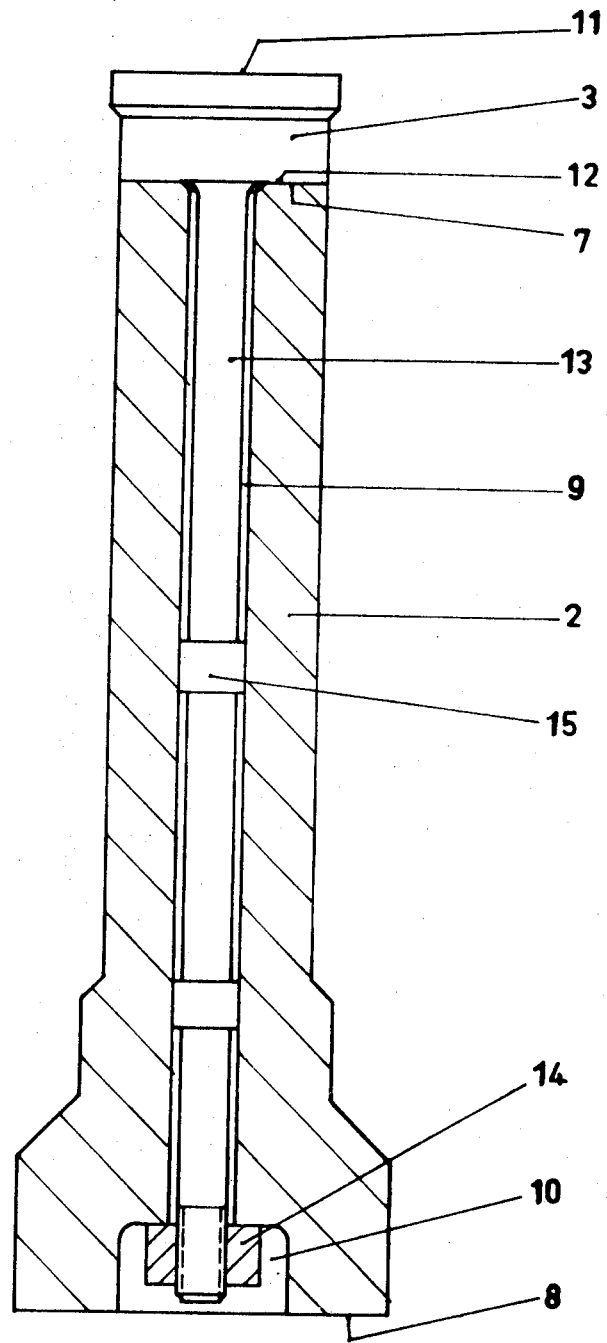

PLUNGER FOR EXTRUSION PRESS

BACKGROUND OF THE INVENTION

This invention relates, generally, to extrusion presses and, more specifically, to an arrangement of pressure heads on plungers of presses for extrusion shapes from light metals.

It is known in presses for extrusion of metals how to arrange a pressure head or a dummy head between the front end of a plunger body and the material to be extruded against a press mandrel. In most cases, the pressure head has been loosely coupled with the front end surface of the plunger body, namely, without any positive connection. Such a prior art arrangement, however, has the disadvantage that after the completion of the extrusion process the detachable pressure head remains arrested on the remnant of the billet and must be forcibly pushed out from the container. Subsequently, the extrusion remnants are removed from the pressure heads either by means of a cup-shaped pressing tool within the press, or manually outside the press, so that the same pressure head can be re-employed in another extruding operation. The removal of extrusion remnants from the pressure head, however, is a time-consuming process during which the pressure head may become damaged.

In another known arrangement, the pressure head is positively coupled with the front surface of the plunger body; for example, by screwing the pressure heads on a threaded end of the plunger. This measure has, in any event, the advantage that the pressure head does not remain in the container during the return of the plunger after the completion of the extrusion process and that the aforementioned additional work is avoided. Nevertheless, the pressure heads which are rigidly tightened at the end of the plunger body very quickly wear off and must be replaced after a few days of operation.

The cause of this phenomenon occurring in a plunger with a rigidly connected head is in the fact that the plunger and the container are never accurately centered with respect one to the other; namely the longitudinal axes of the plunger and of the container which theoretically should be mutually aligned are never truly lined up in an actual embodiment. The mutual deviation of the two longitudinal axes can be proportional to the size of the extrusion press, namely, to the distance which the front surface of the plunger has to travel without support towards the edge of the inlet opening of the container.

As a result, the pressure head which is firmly tightened to the plunger, strikes with a lateral deviation against the inlet opening of the container and frequently it impacts against the edge of the container opening and becomes damaged. In any event, during farther progress of penetration into the container, the pressure head is forced against one side of the wall of the container with a greater force than against the opposite side. The resulting increased friction at one side of the container wears off the pressure head and makes it, in a short time, unusable.

In another known arrangement of the pressure head as described, for instance, in the U.S. Pat. No. 3,385,091 to Relza J. Hess, the pressure head is supported on an elongated stem passing through an axial bore in the plunger body. The stem has at its front region a guide portion of enlarged diameter that fits the axial bore with a clearance. Similarly, a clearance is provided between the facing surfaces of the plunger body and of the pressure head, whereby the other end of the stem is secured to a nut which is axially movable within a recess at the rear end of the plunger body.

This arrangement allows some float of the pressure head; nevertheless, to keep the axial and radial play of the pressure head within predetermined limits, a very accurate dimensioning and machining of the entire structure is necessary. Consequently, the manufacture and replacement of the dummy pressure head is very costly.

It is, therefore, an object of this invention to remove the disadvantages of prior art arrangements of a pressure head in the extrusion press.

More specifically, an object of this invention is to provide a pressure head which, within certain limits, will allow the centering of the pressure head within the extrusion container.

Another object of this invention is to provide a pressure head which is firmly connected to the plunger body.

Still another object of this invention is to provide a pressure head which is wear-resistant, simple in manufacture and in its assembly, and which has a considerable lifetime.

SUMMARY OF THE INVENTION

The above objects of this invention are attained by providing the pressure head with a supporting elongated stem which passes with a clearance through an axial bore in the plunger body whereby the center region of the stem is provided with a collar which tightly fits into the bore; the rear end of the stem is tightened by a threaded nut against the rear end of the plunger body. In this manner, it is achieved that, in spite of the fact that the stem is locked against axial movement, the relatively long portion of the stem between the pressure head and the collar allows, due to flexibility of material of the stem, a radial movement of the pressure head within the limits of the clearance between the stem and the axial bore. The tightening nut need not fit accurately into the recess at the rear face of the plunger body and the stem within the bore is self-centering.

BRIEF DESCRIPTION OF THE DRAWING

For a better understanding of the instant invention, reference is had to the following detailed description of an example of one embodiment thereof, taken in conjunction with accompanying drawings in which:

FIG. 2 is a sectional elevational view of a plunger according to this invention for the extrusion press of FIG. 1.

DETAILED DESCRIPTION

Figure 1:
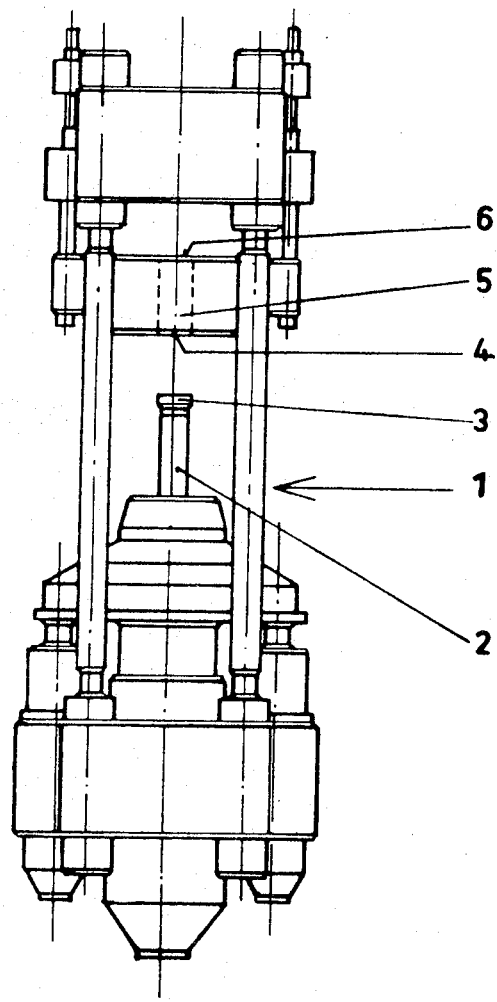
FIG. 1 is an elevational view of a conventional extrusion press.

Referring now to FIG. 1, the extrusion press 1 includes an axially movable plunger 2 with a pressure head 3 on its front face. Under the pressure of the plunger 2, a metal material which has been inserted into the inlet opening 4 of a container 5 is extruded through an outlet opening 6 having the form of a pressure die (not illustrated) and is shaped thus into a desired form.

The plunger 2 comprises a tubular plunger body having in its interior a longitudinal axial through-bore 9 extending from a front face 7 to a rear face 8 of the plunger body. The diameter of the plunger body is step-like extended towards the rear end of the latter and is provided with a recess 10 communicating with the through-bore 9.

The lower surface of the pressure head 3 mates with the front face 7 of the plunger body and is arranged for an axial movement thereon. The top surface 11 of the pressure head facing the inlet opening of the container 5 is symmetrically encased in its outer diameter with respect to the lower surface 12.

The center area of the lower surface 12 of the pressure head is rigidly connected with an elongated stem 13 passing with a clearance through the axial bore 9 in the plunger body. The opposite end of the stem 13 is secured to the rear face of the plunger body preferably by a screw connection.

The diameter of the stem 13 is considerably smaller than the inner diameter of the through-bore 9; the resulting clearance amounts to approximately 40 percent of the diameter of the stem 13, for example. To prevent movement in axial direction of the stem 13, a nut 14 is in engagement with a threaded end of the stem 13 projecting into the recess 10.

According to the invention, a central region of the stem 13 is provided with a collar-shaped portion 15 tightly fitting into the bore 9. It is possible to provide the front portion of the stem between the collar 15 and the nut 14 with additional tightly-fitting collars to reinforce the fixing effect of the central collar 15.

The front portion of the stem 13 between the collar 15 and the pressure head 3, however, must be devoid of any collars, since this front portion must be capable of a flexible displacement in any radial direction within the limits of its clearance. Similarly, the pressure head 3 which is arranged for radial movement on the front face 7 of the plunger body, yields, due to its elasticity, to such a small radial displacement of the front portion of the stem 13.

The arrangement of this invention makes it possible that the pressure head is fixedly connected with the plunger body in the sense that during the traction of the plunger 2 after the completion of an extrusion cycle the pressure head is withdrawn from the container 5 together with the plunger 2. On the other hand, the pressure head 3 is slidably seated on the front face 7 of the plunger body so that the head 3 can accommodate itself during the penetration of the plunger into the recipient 5 to radial deviations in the alignment of axes of the plunger and of the recipient, thereby avoiding excessive one-sided loads acting transversely to the longitudinal axis of the plunger. As a result, bending stresses caused by such one-sided loads are neutralized by the supporting stem itself and not by the body of the plunger as the case is in prior art arrangement with rigidly mounted pressure heads. The plunger, therefore, cannot be deformed.

The experience with extrusion presses equipped with the above-described plunger arrangement according to this invention has shown that the press is able to operate faultlessly for a long period of time without the replacement of the pressure head, whereas the plungers of another structure have to be replaced after several days of action. In addition, the arrangement of this invention eliminates the removal of press billets from the pressure head and consequently saves personal and operational costs.

Variations and modifications may be made within the scope of the invention. For example, it is also possible to make the bore 9 from the pressure head lower surface 7 so as to terminate about halfway in the plunger body; at the bottom of the bore 9 an inner thread can be provided and a corresponding threaded end portion of the supporting stem 13 is screwed in. The stem 13 in this case corresponds to the front stem portion as described in the example of the previous embodiment and the collar 15 is omitted.

It will be understood that various materials and other structural details may be employed within the scope of the appended claims.

I claim:

1. A plunger for an extrusion press, especially for extrusion of shapes of light metals comprising in combination
   an elongated plunger body having an axial bore, a front face, and a rear face,
   a pressure head arranged for radial movement relative to the front face,
   an elongated stem secured at one end thereof near said front face to said pressure head and passing with a clearance through said bore, and
   a collar for securing said stem in said bore, said collar arranged on a central portion of said stem and tightly fitting in said bore, said stem being disconnectably secured to said body near said rear face whereby the flexibility of the stem portion between said collar and said pressure head allows for radial displacement and central alignment of said pressure head in a recipient.

2. A plunger according to claim 1 wherein said clearance of said stem amounts to at least 40 percent of the diameter of said bore.

3. A plunger according to claim 1 wherein said stem is locked against movement in axial direction.

4. A plunger according to claim 3 wherein said rear face includes a recessed portion, said other end of said stem being threaded and secured to said rear face by a nut located in said recessed portion.

5. A plunger according to claim 4 further comprising an additional tightly fitting collar disposed between said central collar and said nut.

* * * * *